(12) United States Patent
Korn (10) Patent No.: US 6,292,820 B1
(45) Date of Patent: Sep. 18, 2001

(54) PORTING POSIX-CONFORMING OPERATING SYSTEMS TO WIN32 API-CONFORMING OPERATING SYSTEMS

(75) Inventor: David Gerard Korn, New York, NY (US)

(73) Assignee: AT& T Corp., New York, NY (US)

(*) Notice: Subject to any disclaimer, the term of this patent is extended or adjusted under 35 U.S.C. 154(b) by 0 days.

(21) Appl. No.: 08/688,128

(22) Filed: Jul. 29, 1996

(51) Int. Cl.⁷ ................................................ G06F 9/00
(52) U.S. Cl. ................................ 709/100; 709/328
(58) Field of Search ................................ 395/670, 671, 395/672, 673, 674, 675; 709/100–108, 1, 200–253, 310–332; 717/1–10

(56) References Cited

U.S. PATENT DOCUMENTS 4,747,040 * 5/1988 Blanset et al. .................. 709/108

OTHER PUBLICATIONS

"Tools to Close Gap Between NT and Unix; Once the Province of the Software Entile, Porting is More Widely Applied." Mayer, John Software Magazine, Sep. 1994.*
"Nutcracker to Attempt to Merge SPEC 1170 With Win 32 Application Programming Interface." Computer Gramm International Apr. 1994.*
"Multics" The Multics System pg, 1972.*
"Porting Unix x/Motif Software to Windows NT" DataFocus, Inc, 1996.*
"Two Tools to Port Urix Code to NT. (DataFocus Nutcracker Program Translator and Software Systems" OpenNTOS Enhancement) Parker, Tim, 1997.*
Version 1 Help File for Nutcracker Ftd. Nutcracker/docs/Porting Guide /version//nc iapg.hlcp, 1994.*
I.E.E.E. POSIX Standard 1003.1b (1993).
WIN32 Programmer's Reference, vols. 1–3 (Tbl. of Contents, Intro., Ch's 1–4, 16, 24, 26, 27, 29, 32, 39, 40, 42–48, 50–53, 56, 58, 85) Microsoft Press 1993, Note: The Win32 Programmer's Ref. Books Were Obtained by the PTO EIC and Reviewed by the Examiner, (3 vols.).

Mark Pace, "Nutcracker takes the shells out of moving to 32 bit", Infoworld, May 20, 1996, pp. 114.
Martin Heller, "Plug Windows Into the Net", Windows Magazine 1996, pg. 251.
Information Week, "Open A New Window: Techniques to minimize the complexities of porting Unix applications to Windows NT", Mar. 11, 1996, p. 1A.
Peter D. Varhol, "Port Unix apps to Windows NT without giving your programmers shell shock", Government Computer News, Feb. 5, 1996, p. 24(1).
PC Week, "Nutcracker adds NT GUI to Unix apps; upgrade employs Wintif to restyle Motif–based software", Sep. 25, 1995, p. 37.
Newsbytes News Network, "Unix Expo—Nutcracker Gets Update, Intro To Japan", Sep. 22, 1995.

* cited by examiner

Primary Examiner—St. John Courtenay, III
Assistant Examiner—George L. Opie
(74) Attorney, Agent, or Firm—Kenyon & Kenyon (57) ABSTRACT

Techniques for porting operating systems of a first class whose representatives include operating systems implementing the POSIX standard to operating systems of a second class whose representatives include operating systems implementing the Win32 API. Processes belonging to operating systems of the first class are characterized by a single thread, parent-child relationships, and signal handlers that execute on the top of the stack; processes belonging to operating systems belonging to the second class have multiple threads, do not have parent-child relationships, and do not necessarily execute their signal handlers at the top of the stack. Techniques are disclosed for implementing signal handling as required for operating systems of the first class and providing a signal to a parent process of the first class when one of its child processes terminates. Processes of the second class adapted for implementing processes of the first class are disclosed, as well as implementations of the POSIX fork and exec functions using those processes.

7 Claims, 9 Drawing Sheets

```
     5  typedef struct Psig_t
     6  {
     7          unsigned long sigmask;    ——403
     8          unsigned long sigign;     ——404
401  9          unsigned long siggot;     ——405
    10          unsigned char sigsys;     ——406
    11          BOOL          sp_flags;
    12  } Psig_t;

16  typedef struct Pprocfd_t
    17  {
    18  409——  short  fdi;       /* index into fdtab */
407 19  411——  char   cloexec;   /* close on exec flag */
    20  413——  HANDLE handle;    /* per process handle */
    21  415——  HANDLE xhandle;   /* extra handle for some types */
    22  } Pprocfd_t;

25  typedef struct Pproc_t
    27  {
    28          char           prog_name[16]; /* To save the program name, used in ps */
    29          DWORD    419—— ntpid;         /* NT process id */
    30          HANDLE   421—— ph;            /* handle of this proc entry */
    31          HANDLE   423—— ph2;           /* handle of original proc entry if exceed */
    32          HANDLE   425—— thread;
    33          HANDLE   427—— sigevent;
    34          HANDLE         waitevent;
    35          HANDLE   429—— socketevent;
    36          HANDLE         tty_select;
    37          long           inuse;         /* zero means free */——431
    38          pid_t          pid, ppid, pgid, sid;  ——433
309 39          Pprocfd_t      fdtab[PROCFDSIZE];     ——435
    40          Psig_t         siginfo;       ——401
    41          mode_t         unmask;
    42          unsigned char  posixapp;      /* Yes/no */
    43          unsigned char  inexec;        /* set when process is to exec */——437
    44          unsigned char  state;         /* state the process is in */——439
    45          unsigned char  maxfd;
    46          unsigned char  notify;        /* set if stopped but status not returned */
    47          unsigned short exitcode;
    48          short          console;       /* dev index for console */
    49          unsigned int   alarm;
    50          unsigned long  alarmremain;
    51          time_t         cutime;                ——441
    52          time_t         cstime;
    53          void           *forksp;       ——443
    54  } Pproc_t;
```

PORTING POSIX-CONFORMING OPERATING SYSTEMS TO WIN32 API-CONFORMING OPERATING SYSTEMS

BACKGROUND OF THE INVENTION

1. Field of the Invention

The invention generally concerns the problem of porting one operating system to another. More specifically, the invention concerns porting operating systems which conform to the POSIX standard to operating systems which conform to the Win32 API.

2. Description of the Prior Art

When an application programmer writes a program, he or she is writing the program for a machine which is defined by the characteristics of the physical machine that the program is to run on and the operating system which is controlling that physical machine when the physical machine executes the program. Originally, the applications programmer had to know both a programming language specific to the machine he was programming and the operating system that the machine was running. Life became simpler for the applications programmer when programming languages were developed which were machine independent, i.e., their instructions were automatically compiled or interpreted into the proper form for the machine that the program was to be executed on.

There remained the problem of the operating systems. Originally, each computer manufacturer sold its own proprietary operating systems. In the world of commercial data processing, these proprietary operating systems are still dominant; in the world of scientific and technical computing, on the other hand, operating systems based on the UNIX operating system (UNIX is a trademark of X/OPEN) became dominant, and eventually, an IEEE and ISO standard for such operating systems emerged. This standard is the so-called POSIX standard (IEEE Std 1003.1b-1993; POSIX is a registered trade mark of the IEEE). Operating systems which conform to the POSIX standard exist for hardware of all sizes from personal computers to the largest mainframes (such operating systems are termed herein "POSIX operating systems").

The existence of the POSIX standard together with high-level languages such as C or C++ meant that the programmer could write a single program which needed only be recompiled to run on any machine from a personal computer to the largest mainframe, as long as that machine was running a POSIX operating system. As a consequence of this, changing from one manufacturer's work station to another manufacturer's work station typically requires little more than a recompilation of the application programs. If, however, the machine the program was to run on had a different operating system, the program had to be extensively rewritten.

At the same time that POSIX was becoming the standard for operating systems in the scientific and technical computing worlds, the personal computer revolution was taking place. Microsoft Corporation became the dominant manufacturer of operating systems for personal computers. By 1993, Microsoft had developed the Win32 Application Program Interface (API) and had announced that all of its future operating systems would conform to the Win32 API. (Win32 is a trademark of Microsoft Corporation; the Win32 API is described in the *Win32 Programmer's Reference*, vols. 1–3, Microsoft Press, 1993.) An operating system that implements the Win32 API is termed henceforth a "Win32 operating system".

Neither the first personal computer systems nor the first Microsoft operating systems were powerful enough to perform the kinds of tasks performed by the machines that ran POSIX operating systems; however, fully-implemented Win32 operating systems are as competent as POSIX operating systems, and the hardware in modern personal computers has become the equal of that found in scientific and technical work stations. At the same time, the number of personal computers is orders of magnitude larger than the number of any other kind of computer. The enormous market for the machines is resulting in a rapid decrease in their cost and in the production of enormous volumes of software for them, and these factors have in turn made the Win32 API a de facto standard of rapidly growing importance.

The emergence of personal computing and the Win32 API has placed the users of programs which are executed on a POSIX operating system in a difficult position (henceforth, "POSIX programs"). On the one hand, the advantages of personal computers are clear: they cost much less than scientific workstations of comparable power and they provide a highly-desirable graphical user interface and numerous useful application programs such as word processors and spread sheets. On the other hand, POSIX programs will not run on Win32 operating systems without extensive revisions. Thus, the low cost of the personal computers is more than outweighed by the costs of rewriting POSIX software for them and the user of the POSIX programs must choose between his programs and the computing environment offered by personal computers running a Win32 operating system.

One way of avoiding the need to rewrite POSIX programs is to port a POSIX operating system to a Win32 operating system. An operating system is ported to a machine when a version of the operating system is written for the machine. When the version is executed, the machine carries out out the functions defined for the operating system. For example, a port of a POSIX operating system to a personal computer is a program which causes the personal computer to carry out the functions defined for POSIX. Of course the "machine" to which the port is made can be defined by an operating system as well as hardware. Thus, a port of a POSIX operating system to a Win32 operating system is code which when executed on a machine that is running the Win32 operating system causes that machine to carry out the functions defined for POSIX.

There are several advantages to porting a POSIX operating system to the Win32 operating system instead of simply porting it to the hardware that the Win32 operating system is running on. First, the POSIX operating system appears to the user of the Win32 operating system simply as another application; thus, the user has available not only the POSIX programs, but also the Win32 programs. Second, POSIX programs running on the ported POSIX operating system can not only access POSIX system calls, but also Win32 system calls.

Given the advantages of porting a POSIX operating system to a Win32 operating system, it is not surprising that at least two attempts have been made to provide such a port. One, NuTCRACKER, is produced by Data Focus Incorporated. NuTCRACKER is a registered trademark of Data Focus Incorporated; information about NuTCRACKER could be found in 1996 at the URL www.datafocus.com. The other, Portage, is produced by Consensys Computers, Inc. Information about Portage could be found in 1996 at the URL www.consensys.com. Neither NuTCRACKER nor Portage is a complete port, that is, they reduce the amount of effort needed to adapt a POSIX program to run on a Win32 operating system, but they do not yet have the most important property of a complete port, that is, that all the user of a POSIX program need do to run his POSIX program on the Win32 operating system is to recompile his POSIX program.

Technically, what happens in a port of a POSIX operating system to a Win32 operating system is that each system call in the POSIX operating system is implemented by a function which executes on a Win32 operating system. The code for the function employs the resources provided by the Win32 operating system to provide the semantics specified for the system call in the POSIX operating system. Often, all that is involved in writing a function that implements a POSIX system call in the Win32 operating system is invoking a system call in the Win32 operating system that has the same semantics as the POSIX system call. However, where there are substantial semantic differences between the operating systems, porting is more difficult.

One area in which the differences between the POSIX operating system and the Win32 operating system are particularly large is in the semantics of processes. In a computer system, a process is the entity in the operating system which represents a given execution of a program by the computer system. Typically, each process has its own address space, that is, the program being executed by a given process may read and write data in the given process's address space, but not in another process's address space. In order to port a POSIX operating system to the Win32 operating system, it is necessary to overcome the semantic differences between POSIX processes and Win32 processes so that POSIX programs which are in fact being executed by Win32 processes behave exactly as if they were being executed by POSIX processes. It is an object of the present invention to overcome these differences, and thereby to produce a POSIX port to the Win32 operating system which more closely approaches the goal of a complete port than the POSIX to Win32 ports heretofore available.

SUMMARY OF THE INVENTION

The foregoing object is attained by implementing a POSIX process by means of a Win32 process in which the primary thread of the WIN32 process executes the program specified for the POSIX process and other threads are used to implement POSIX signalling, to maintain the POSIX parent-child relationships, and to implement the semantics of the POSIX exec function.

The thread which implements POSIX signalling does so by suspending the Win32 process, modifying its state so that the Win32 process will execute the POSIX signal handler at the top of its user stack, and then resuming the Win32 process.

One of the POSIX signals is the SIGCHLD signal, which a POSIX operating system provides to a parent POSIX process when one of its children terminates. This signal is implemented by employing another thread which resumes execution when the child terminates and provides the SIGCHILD signal to the parent. The signalling thread then responds to the signal by executing the handler as described above.

Another aspect of the invention is methods for performing the POSIX fork and exec operations using Win32 processes. In the case of fork, the Win32 process executing fork (the forking process) saves jump state for a later transfer of control, creates a new Win32 process (the forked process), and copies its state, including the jump state, to the forked process. The forked process then performs an operation which transfers control as specified in the jump state.

In the case of exec, the Win32 process performing the exec operation (the "execing process") replaces itself with a new Win32 process but preserves the parent-child relationships of the POSIX process corresponding to the execing Win32 process are preserved and then terminates itself.

Other objects and advantages of the apparatus and methods disclosed herein will be apparent to those of ordinary skill in the art upon perusal of the following Drawing and Detailed Description, wherein:

Reference numbers in the Drawing have two parts: the two least-significant digits are the number of an item in a figure; the remaining digits are the number of the figure in which the item first appears. Thus, an item with the reference number 201 first appears in FIG. 2.

DETAILED DESCRIPTION OF A PREFERRED EMBODIMENT

The following Detailed Description begins with descriptions of the semantics of processes in POSIX operating systems (henceforth "POSIX processes") and the semantics of processes in Win32 operating systems (henceforth "Win32 processes"). Thereupon it provides a detailed explanation of how a POSIX process is implemented in a Win32 operating system and of how the implementation is used to implement the POSIX fork and exec system calls.

Figure 1:
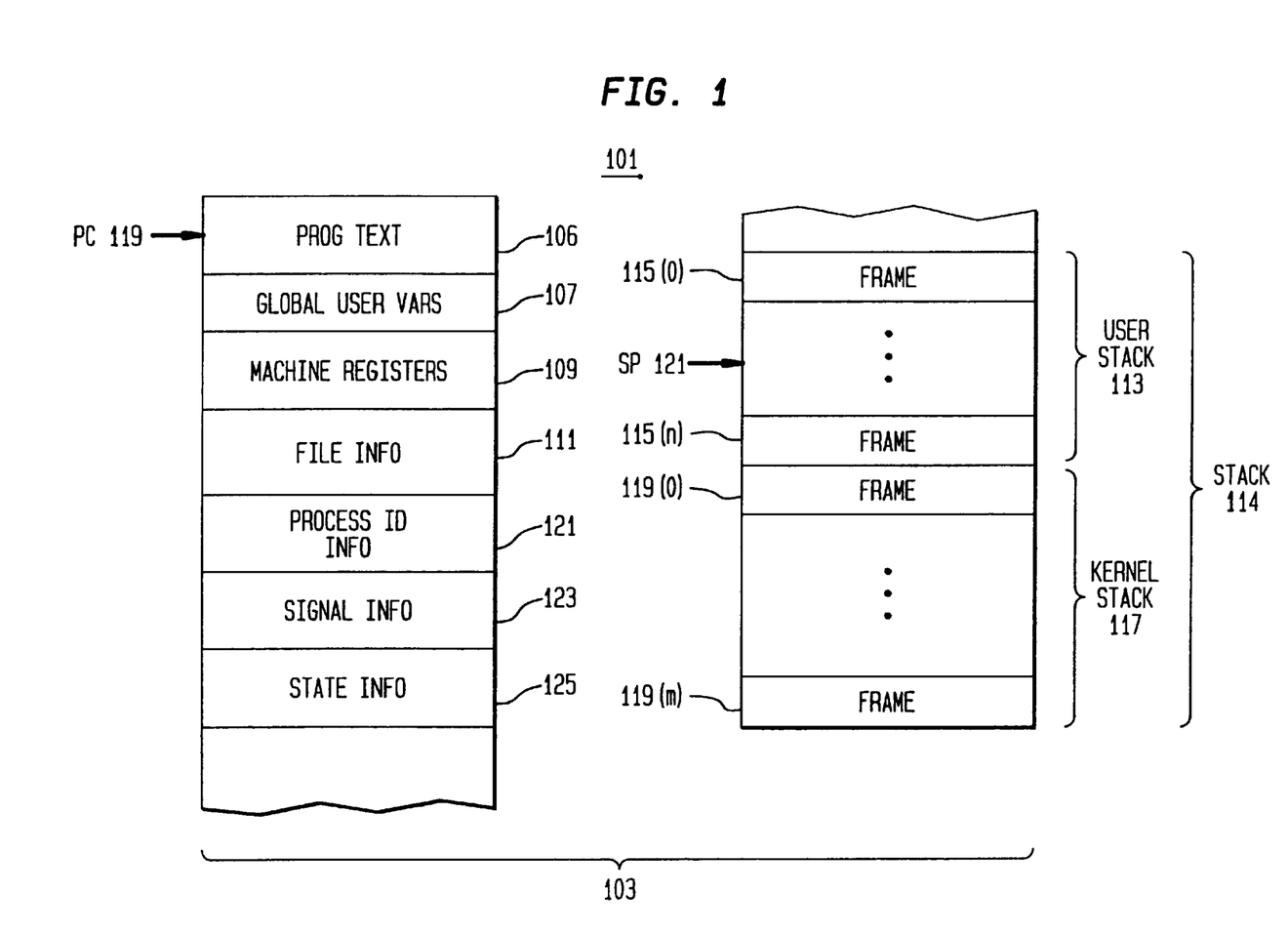
FIG. 1: Overview of a POSIX process.

Semantics of a POSIX Process: FIG. 1

FIG. 1 provides a high-level overview of a POSIX process. The process is executing a program and the figure shows the information the POSIX process maintains about the execution. How the information is represented is of course dependent on the particular implementation of the POSIX process. The information associated with a POSIX process 101 makes up process context 103 for the process. All of the information in process context 103 is part of POSIX process 101's process address space. Read-only information in process context 103 may be shared among several POSIX processes; such shared information is part of the address space of each of the sharing POSIX processes. Writable information in process context 103 is accessible only to the program execution being carried out by POSIX process 101.

The context of course includes program text 105 for the program the POSIX process 101 is executing. Program text 105 is read-only, and therefore may be shared. The context further includes memory for global user variables 107, which may be accessed from anywhere in program text 105. Next is machine registers 109, which is a set of registers which are defined by the hardware upon which the program is being executed. Included in these registers are program counter 119, which contains the location of the instruction in program text 105 which is currently being executed by the process, and stack pointer 121, the location of the frame in user stack 113 which is currently being used by the execution. File information 111 contains the information needed to located the files in the computer system which are required for the program execution being carried out by the process 101. Each file which a process 101 has open is identified within the process by a non-negative integer file descriptor.

Next, there is process ID information 120. Each POSIX process has a process identifier or pid. The pid for a POSIX process is a non-negative integer value which is not reused by the system until the process it identifies is terminated and the parent process does a wait. Each POSIX process is further created as a child of a parent process; finally, a POSIX process may belong to a process group of processes. Process ID information 121 for a process 101 contains process 101's own pid, the pid of its parent process (ppid), and if the process 101 belongs to a group of processes, an identifier for the group.

Like other operating systems, the POSIX operating system has a mechanism which permits a POSIX process to respond to events which are asynchronous to the process's execution of its own code. The events may be produced by hardware performing operations for the process, or they may be produced by programs executing in other processes. In the POSIX operating system, this mechanism is termed the signalling system. When an asynchronous event occurs, the operating system produces a signal to the process which must respond to the event. Among the signals provided by the POSIX operating system is a SIGCHLD signal, which is signalled to a parent process whenever one of its child processes terminates.

A POSIX process may determine both what signals it receives and how it responds to the signals it does receive. The information to do this is contained in signal info 123. Included therein is a mask for determining which of the signals process 101 will respond to, a data structure which indicates which of the signals that process 101 responds to have been received, and data structures which indicate how process 101 will respond to a signal that it receives. Included in these latter data structures is one which relates user-defined signal handling functions to signals. The mask and the other data structures are read and set using POSIX functions. When the process receives and can respond to a signal and there is a user-defined function corresponding to the signal, the process responds by executing the function as it would any other function. State information 125, finally, contains the current state of the process from the point of view of the operating system.

Process context 103 finally includes a stack 114 which is used for data which is local to a given invocation of a function. Stack 114 has two parts, user stack 113 and kernel stack 117. User stack 113 has a frame 115 corresponding to each active invocation of a user function. Each time a user function is invoked, a user stack frame 115 is created for the invocation. Stack frame 115 lasts until the invocation of the user function is finished. When a signal handler function is invoked, the result is exactly the same as for an ordinary function, namely the creation of a stack frame for the signal handler function at the top of user stack 113. Kernel stack 117 is used for data which is local to a given invocation of a kernel operating system function. These functions are provided by the operating system. Each invocation of such a function has a kernel stack frame 117. Kernel stack 117 is accessible to process 101 only when process 101 is operating in kernel mode, that is, executing one of the kernel functions.

As may be seen by the foregoing, POSIX processes are characterized by the following:

each POSIX process has a parent process;

when a child process terminates, POSIX signals the parent process;

A POSIX process has only a single set of machine registers 109 and a single stack 114 with two parts: kernel stack 117 and user stack 113;

signal handler functions are related to signals by an operating system function; and execution of a signal handler function results in creation of a stack frame 115 on user stack 113.

Because a POSIX process has only a single set of machine registers and a single stack, it can represent only a single path (or thread) of a program execution through program text 105. The technical term for such a process is a single-threaded process.

The semantics of POSIX processes are determined by the above characteristics and also by a set of operating system functions which POSIX defines for processes: fork and the exec family of functions. fork is the function in POSIX which creates a new process. When fork is executed by a process, the function creates a new process which is a child of the process that executed fork; the new process has its own process id, and its parent id is that of the process that created it, but the new process otherwise receives a copy of the context 103 of its parent process. The new process is then started. Since the new process has a copy of the context 103 of its parent, both processes continue executing fork. The function returns the pid of the child to the parent and 0 to the child.

When a POSIX process executes one of the exec family of functions, the result is that the process begins executing a program specified as an argument to the invocation of the exec function. In terms of process context 103, program text 105 is replaced by the program specified in the call to exec, stack 114 is replaced by a new stack, and machine registers 109 are replaced by a set of machine register values which are proper for the new program and the new stack.

Figure 2:
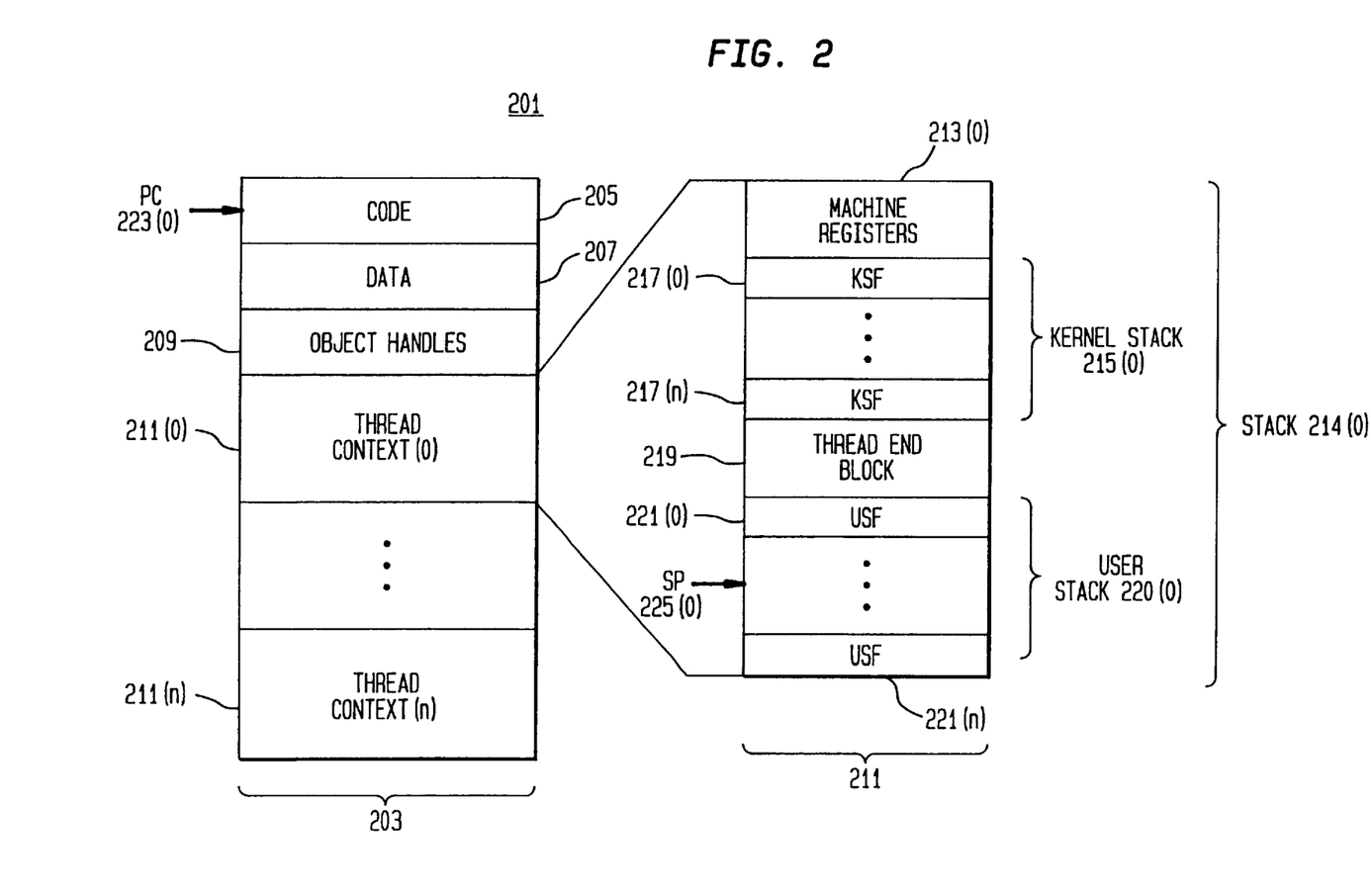
FIG. 2: Overview of a Win32 process.

Semantics of a Win32 Process: FIG. 2

FIG. 2 shows the information associated with a Win32 process 201 at approximately the same level of detail as employed in FIG. 1. Like the POSIX process 101, Win32 process 201 has code 205, which is the code executed by the process, and data 207, which is static data used in the execution of the code. Then the differences begin. The most important difference is that Win32 processes are multi-threaded, that is, the process may be following more than one path of execution through code 205 simultaneously. Each thread may access data anywhere in the Win32 process's address space. Because Win32 processes are multi-threaded, there is not only a process context 203, but within process context 203 one or more thread contexts 211(0 . . . n). Each thread context 211(i) contains machine registers 213(i) and stack 214(i), which contains two parts: user stack 220(i) with user stack frames 221 and kernel stack 215(i), with kernel stack frames 217. Included in machine registers 213(i) are program counter (PC) 223(i), which points to the instruction currently being executed by the thread, and stack pointer (SP) 225(i), which points to the current top frame of user stack 220.

Another important difference is the mechanisms for handling asynchronous events. As described above, POSIX handles them with its signalling system, with its masks, its operating system functions for defining masks and for installing user-defined signal handlers, and its technique of executing the user-defined signal handler in its own frame in user stack 113. In Win32 operating systems, signals are termed exceptions. Exceptions may be produced by the operating system or user programs, and they may be handled by user-defined exception handlers. The user-defined exception handlers are, however, not related to a signal by means of an operating system function, but are rather related to the signal in the source text of a program. In the source text, the programmer may define a portion of his code for which a given exception is to be handled by an exception handler which is also specified in the portion. The programmer may further specify a filter for the portion which specifies the conditions under which the exception is to be handled. The code which is compiled from the source text behaves as follows when it is executed by a thread: the stack frame on the thread's user stack for the execution of the portion includes pointers to the filter and exception handler defined for the portion. If the exception occurs as the portion is being executed in the portion, the Win32 operating system first executes the filter to determine whether the exception is to be handled. If it is, the operating system searches down user stack 220 for the thread that is executing the code until it finds the pointer to the exception handler. It then executes the exception handler on the stack frame that includes the pointer.

A further difference is the use of handles to represent entities controlled by the operating system. Win32 processes are represented by handles, and the state of a Win32 process contains additional handles which represent the process's threads and entities such as files and sychronization objects. The latter are used by the threads, to synchronize their behavior. A process may use the handle to open the object it represents and may also close the handle. After the process has opened the object, it may access the entity represented by the handle. An entity may be represented by more than one handle, and the Win32 operating system provides a function which duplicates the handle for an entity from one process and provides the duplicated handle to another process. Internally, processes are represented in the Win32 operating system by integers. As long as there remains a handle for a given entity which has not been closed, the Win32 operating system will not reuse the integer for the entity represented by the open handle.

Finally, there is no parent-child relationship among Win32 processes. A Win32 process which creates another process receives a handle to the new process, but the new process does not have a handle to the process that created it.

As would be expected from the foregoing, there are also no functions in Win32 corresponding to the POSIX fork and exec functions. Instead, there are CreateProcess and CreateThread functions. CreateProcess simply creates a new Win32 process with a single thread, called the primary thread. An argument in the invocation specifies a portion of the process's code which is to be executed by the primary thread. The new process can inherit handles, environmental variables, the current directory, and the console of the parent process, but is otherwise completely independent. In contrast to a POSIX process created by fork, the new process does not know the identity of the process that created it and does not share the parent's code or have copies of the parent's stack and machine registers.

CreateThread creates a new thread in the Win32 process which calls the function. An argument in CreateThread specifies the code to be executed by the new thread. The thread in which CreateThread is executed is not affected by the creation of the new thread. In contrast to the POSIX exec functions, there is no way in Win32 for a thread to begin executing one program and then replace that program and the state for the execution with another program and the state for that execution.

Problems Arising From the Semantic Differences

The semantic differences between POSIX processes and Win32 processes pose the following problems for a port of a POSIX operating system to a Win32 operating system:

maintaining the parent-child relationship between a POSIX process and the processes that POSIX process creates;

maintaining the process group relationships for the POSIX process and the processes it creates.

maintaining the POSIX signalling system in a multi-threaded environment that does not execute exception handlers at the top of user stack 220;

with fork, giving the new process the old process's context; and with exec, permitting the process to keep its identity and children when it begins executing new code.

The solutions for these problems employed in a preferred embodiment will be described in the following in detail.

Figure 3:
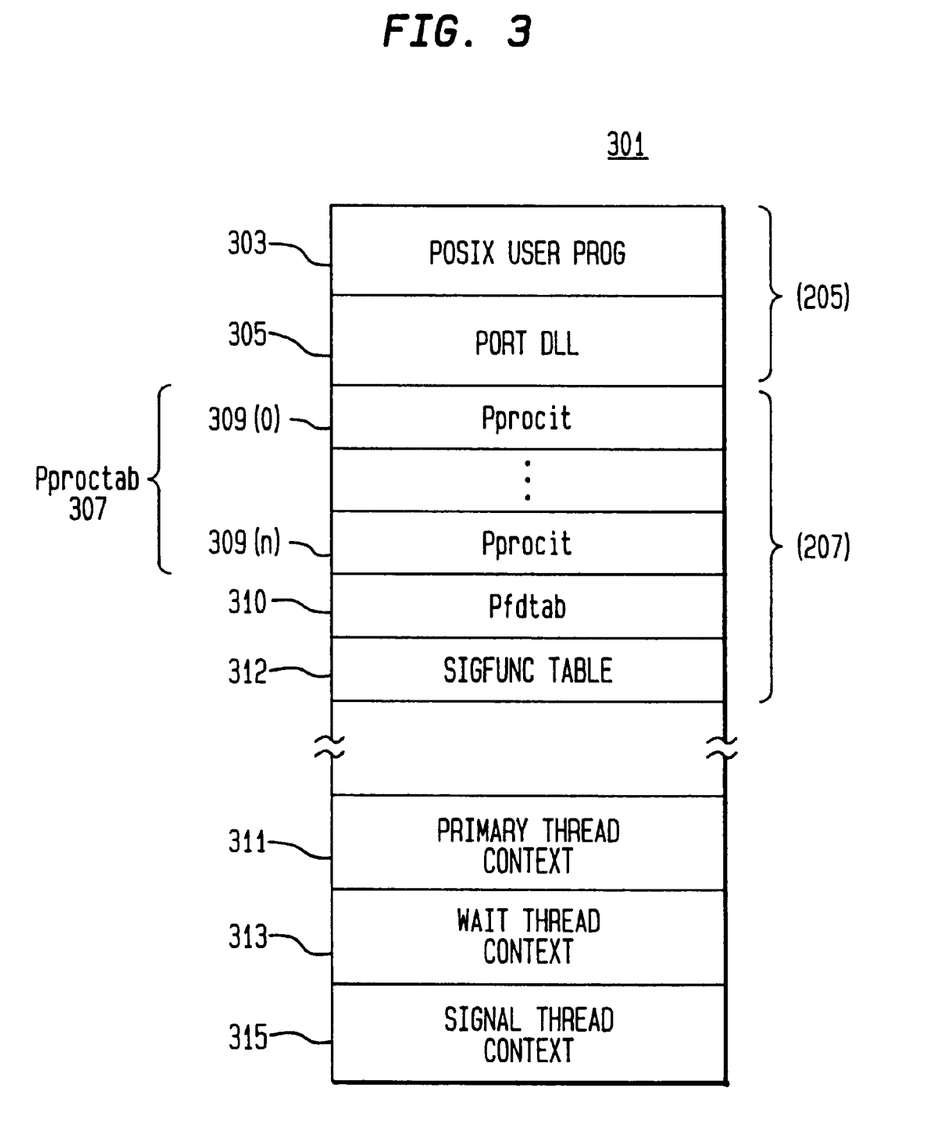
FIG. 3: Overview of a Win32 process configured to represent a POSIX process.

Implementing a POSIX Process Using a Win32 Process: FIG. 3

FIG. 3 is a representation of a Win32 process 301 when it is being used in the preferred embodiment as part of a POSIX process. Such processes are henceforth termed "Win32 POSIX processes". The representation is at the same level of detail as those of FIGS. 1 and 2. Code 205 in Win32 POSIX process 301 includes object code for a user program 303 written for a POSIX operating system and a port dynamically-linked library (DLL) 305. The object code is produced by taking source code for a program written for the POSIX operating system and compiling it on a compiler which produces code for the Win32 operating system. Upon compiling the program, the user further specifies that DLL 305 is to be linked to the program at the time that the Win32 process which is to execute the program begins execution. DLL 305 is a library which implements POSIX system functions by means of functions which execute at the user level on a Win 32 operating system. Two examples of the POSIX system functions implemented in DLL 305 are the exec and fork functions.

Process data 207 for Win32 POSIX process 301 includes two special data structures that are shared by all Win32 POSIX processes: Pproctab 307 and Pfdtab 310. Pproctab 307 is made up of Pproc_t entries 309. Each Win32 process which is being used to implement a POSIX process has a Pproc_t entry 309. As will be explained in more detail later, information in Pproc_t is used to give a Win32 POSIX process 301 the semantics of the POSIX process it is implementing. Pfdtab 310 is a table which has the function of the file descriptor table in the POSIX operating system, i.e., it contains a file descriptor for every file which has been opened by a POSIX process which has not been terminated. A third data structure, sigfunctable 312, is particular to each POSIX process 301. It is an array of pointers to user-defined signal handler functions for POSIX signals.

Win32 POSIX process 301 always has two threads: a primary thread and a signal thread The primary thread executes the code in POSIX user program 303. The signal thread executes code in port DLL 305 which implements POSIX signal handlers. The code suspends the primary thread, examines Pproc_t 309 for the Win32 process to determine what POSIX signal must be handled and what function must handle it, adds a frame for the signal handler function to the primary thread's user stack, and then resumes the primary thread.

If the POSIX process corresponding to Win32 process 301 has a child, Win32 process 301 includes a third thread, the wait thread. The wait thread executes code in port DLL 305 which maintains the parent-child relationship between a POSIX process and its children. In particular, the wait thread sends the SIGCHLD signal which a POSIX process receives when a child of the process terminates; As shown in FIG. 3, a Win32 process 301 corresponding to a POSIX process with a child has thread contexts 311, 313, and 315 for the primary thread, wait thread, and signal thread respectively.

Figure 6:
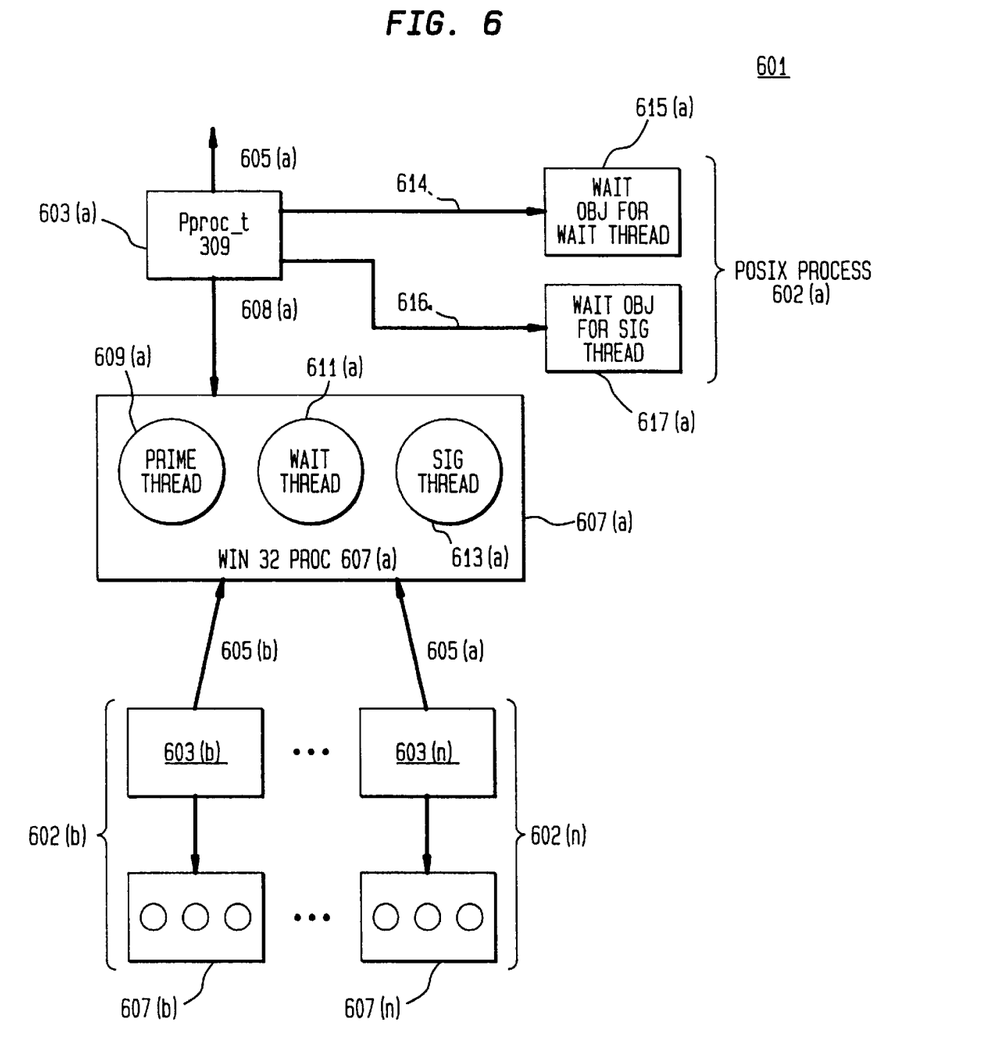
FIG. 6: Overview of a POSIX process as implemented by a Win32 process in the preferred embodiment.

FIG. 6 shows in overview how a set of POSIX processes 601 including a parent POSIX process 602(a) and a group of child processes 602(b . . . n) are represented in the preferred embodiment. Each POSIX process 602 consists of a Win32 process 607 and the Pproc_t entry 603 for the Win32 process 607. Win32 process 607 has two threads: primary thread 609 and signal thread 617. If the corresponding POSIX process 602 has a child, Win32 process 607 also has a wait thread 611. As indicated by arrows 608, 614, and 616, each Pproc_t entry will include the handle for the Win32 process 607, a handle for a wait object 617 for signal thread 613, and if there is a wait thread 611, a handle for a wait object 615 for the wait thread. Finally, each Pproc_t entry 603 includes a pid which can be used to located Pproc_t entry 309 for the parent of POSIX process 602.

Figure 4:
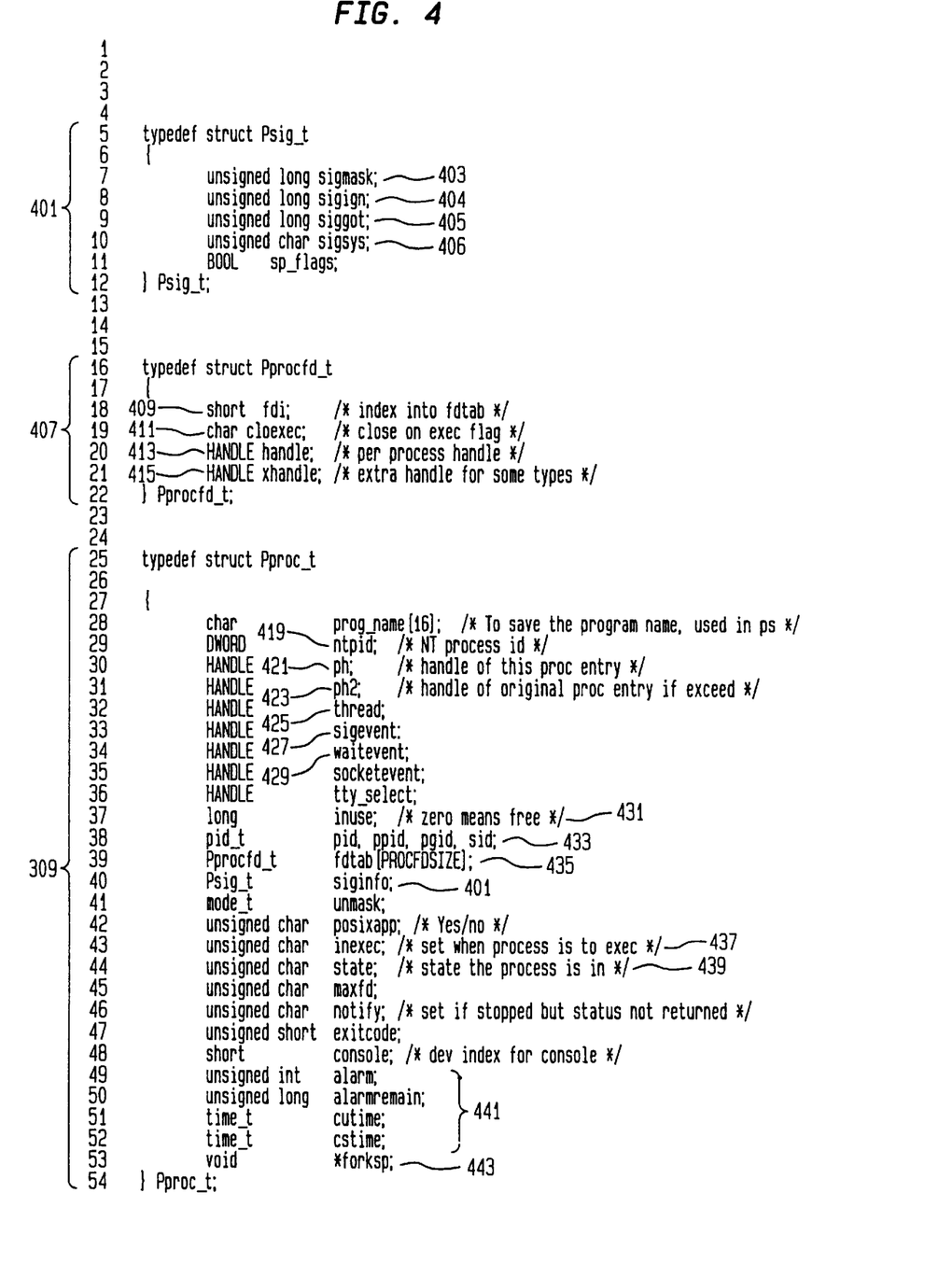
FIG. 4: Detail of Pproc_t structure 309 in a preferred embodiment.

Details of Pproc_t 309: FIG. 4

As mentioned above, each Win32 process which is being used to implement a POSIX process has an entry Pproc_t 309 in Pproctab 307. A POSIX process's Pproc_t 309 contains most of the information needed to make a Win32 process behave like a POSIX process. FIG. 4 shows the C language type definitions for Pproc_t in a preferred embodiment.

The type definitions at 401 and 407 are components of the definition for Pproc_t and will be discussed as they are encountered there. Continuing with Pproc_t 309, interesting data items there are ntpid 419, which is the Win32 process id for the Win32 process represented by Pproc_t 309. ph 421 is a Win32 handle for the Win 32 process; ph2 423 is set when an exec function is executed; it is the handle of the Win32 process which executed the exec function for the first time for the POSIX process to which the Win32 process to which entry 309 belongs. ph2 is saved because the process identifier of the former Win32 process is used as the process identifier of the POSIX process to which the Win32 process to which entry 309 belongs corresponds and therefore cannot be reused. It should be pointed out here that Win32 processes are identified both by process ID's and handles; there may be multiple handles for a Win32 process, but there is only a single process ID; the process ID representing a process may be reused but will not be as long as there is an open handle for the process.

Other handles of interest for the present discussion include the following: thread handle 435 is the handle for the primary thread of the Win32 process which implements the POSIX process. sigevent 427 and waitevent 429 are handles of event objects. Event objects are used in Win32 operating systems to inform a thread that an event of interest to it has occurred. Typically, one thread suspends itself and waits on an event object; another thread in the Win32 process to which the first thread belongs or in another Win32 process sets the state of the event object and the Win32 operating system responds thereto by causing the waiting thread to resume execution. sigevent 427 is the event object that the signal thread waits on; depending on the POSIX signal, sigevent 427 is set by the primary thread of the Win32 process corresponding to some POSIX process or the wait thread of the Win32 process to which the handle in sigevent belongs. waitevent 429 is the event object that the wait thread waits on; waitevent 429 is created the first time the POSIX process represented by Pproc_t 309 spawns a child process and the event object is set each time the POSIX process spawns a child process.

Continuing with inuse field 431, that field merely indicates whether the given Pproc_t is being used by a POSIX process. At 433 are found the process identifiers for the POSIX process. pid is the POSIX process identifier for the POSIX process; as indicated above, it is the pid of the first Win32 process to correspond to the POSIX process. ppid is the POSIX process identifier for the POSIX process's parent; pgid is the POSIX identifier for a group of processes that the POSIX process may belong to. sid, finally, is a POSIX session identifier. All processes created by a given log-in session have the same session identifier. In the preferred embodiment sid is also used to indicate that the Win32 process corresponds to a POSIX process that is executing the exec operation.

fdtab is a per-process array that relates file descriptors for files opened by the POSIX process to the POSIX process. The array element is shown at 407. There is an element for each file that the POSIX process has open. Each element 407 includes an index 409 for the entry for the file in Pfdtab 310, a flag 411 which indicates whether the file is to be closed if the process that has it open executes an exec function, and two handles 413 and 415 for the Win32 file which is implementing the POSIX file. The handles are unique to the POSIX process.

Siginfo 401 contains the information necessary to implement the semantics of POSIX signals. sigmask 403 indicates what POSIX signals the process will not receive; sigign 404 indicates which of the signals the process receives it will actually respond to; siggot 405 indicates which signals are currently pending.

Other fields of interest are inexec 437, which is set when the POSIX process is executing an exec function, state 439, which indicates the POSIX process's current state, time data 441, which includes data that permits a POSIX process to set an alarm for a future time and suspend itself until the time is reached and data indicating how much CPU time and elapsed time the process has required. *forksp 443, finally, is a pointer to the top of the stack of the parent POSIX process at the time a child POSIX process is spawned. Its use will be explained in the discussion of fork which follows.

Figure 5:
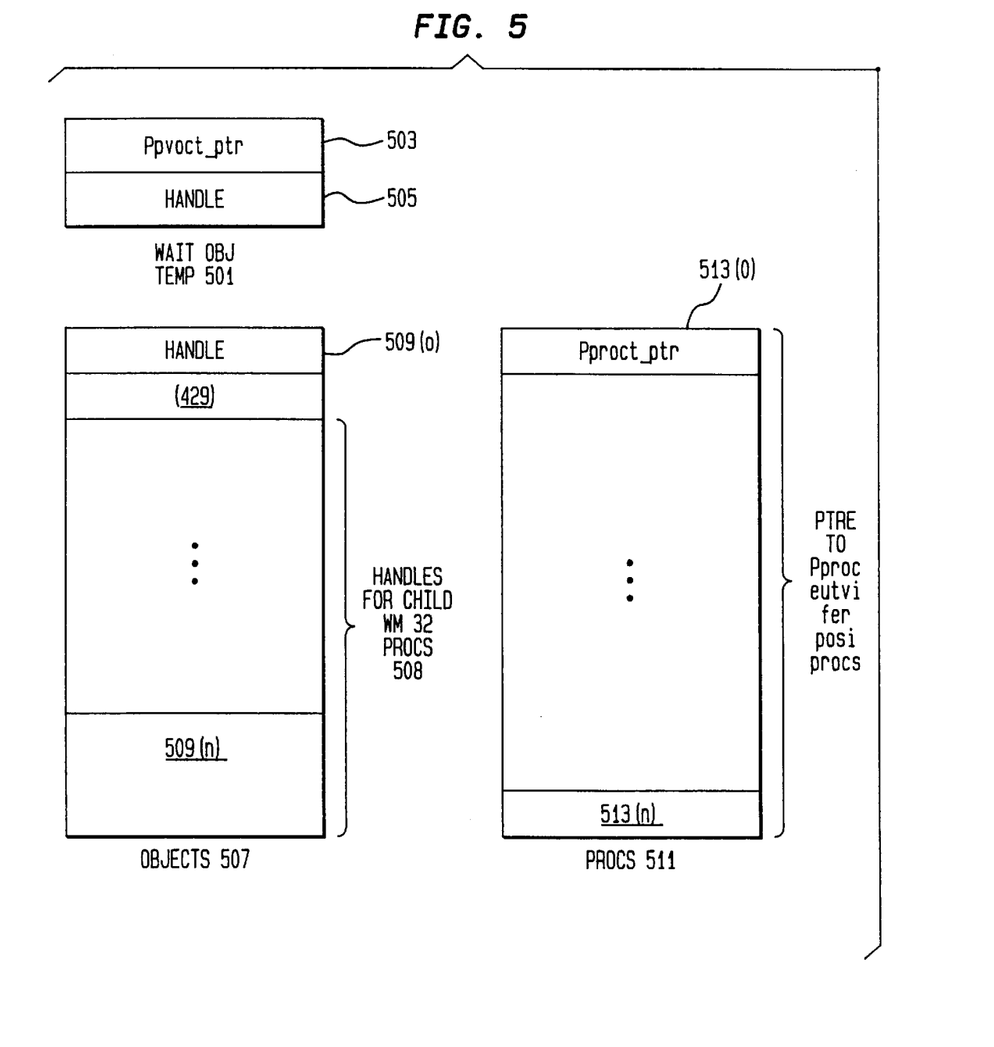
FIG. 5: Data structures used by the wait thread.

Maintaining the POSIX Parent-Child Relationship: FIG. 5

One of the most important differences between POSIX processes and Win32 processes is the parent-child relationship. With a given POSIX process, part of the process's state is the pid of its parent, that is, the POSIX process that executed the system function that created the given POSIX process. Further, when a POSIX process is terminated, its parent POSIX process receives a SIGCHLD signal. There is nothing corresponding to this parent-child relationship among Win32 processes, and consequently, the port must use the resources available in the Win32 operating system to implement the relationship.

In the preferred embodiment, a new Win32 process results whenever a POSIX process executes a fork function or a exec function. In the first case, the new Win32 process corresponds to a new POSIX process which is the child of the POSIX process executing fork; in the second case, the new Win32 process replaces the Win32 process which formerly corresponded to the POSIX process executing exec. With both fork and exec, the relationships between the POSIX process which created the new Win32 process and the new Win32 process are handled by the wait wait thread in the Win32 process which corresponds to the POSIX process that is executing the fork or exec function. The wait thread for the Win32 process maintains data structures which keep track of the children of the corresponding POSIX process; the wait thread further ensures that when a child POSIX process is terminated, the parent receives a SIGCHLD signal.

The data structures used to keep track of the children are shown in FIG. 5. There is a static data structure, wait_obj_temp, which stores a copy of the necessary information for the Win32 process currently being worked on. Pproct_ptr 503 is a pointer to the Pproct entry for the POSIX process corresponding to the Win32 process and handle is a handle for the Win32 process. There are also two arrays: one called objects 507 and one called procs 511. objects 507 contains entries 509 with handles; the handle in entry 509(0) is waitevent handle 429 for the wait object upon which the wait thread of the Win32 process waits. The remaining entries 509 are handles for the Win32 processes corresponding to the child POSIX processes of the POSIX process to which waitevent handle 429 belongs. procs 511 contains entries with pointers to the Pproc_t entries 309 for the child POSIX processes.

The wait thread is created and set running when the Win32 process to which it belongs executes fork or exec for the first time. At that time, handle entry 509(0) is set to waitevent handle 429 and the thread begins executing an endless loop. In the loop, the wait thread waits on the objects represented by the handles in objects 507. Three kinds of events are possible. Events on the wait object represented by handle entry 509(0) occur when a new child POSIX process and its corresponding Win32 process has been created. Events on the wait objects represented by the remaining handle entries 509 occur when a Win32 process corresponding to one of the child POSIX processes represented by a handle entry 509 has been terminated. There are two situations in which this can occur. The first is when termination of the Win32 process requires termination of the corresponding POSIX process; in this case, the parent must receive a SIGCHLD signal; the second is when the termination of the Win32 process is part of the execution of a POSIX exec function and there is no need to terminate the corresponding POSIX process.

Taking the three cases in order, when a new child POSIX process and its corresponding Win32 process have been created, the wait thread responds to the wait object represented by handle entry 509(0) by making entries for the child process in objects 507 and procs 511. When a Win32 process is to be terminated, the wait thread first determines whether the corresponding POSIX process must be terminated. If that is the case, the wait thread takes the actions necessary to terminate both the POSIX process and the corresponding Win32 process. Included in these actions are setting the POSIX process's state 439 so that the Win32 process corresponding to the POSIX process will be terminated the next time the primary thread executes and marking the Pproc_t entry 309 for the POSIX process so that it can be reused after the Win32 process is terminated. Also included is setting siggot 405 in siginfo 401 of the parent to indicate the SIGCHLD signal and setting the event object represented by sigevent 427 in the parent. As will be explained in more detail later, as a result of the setting of the event object, the signal thread in the parent resumes executing and does the processing in the parent for the SIGCHLD signal.

When the Win32 process is to be terminated as part of the execution of a POSIX exec function, two things have to be done: first, the information in the terminated process's entries in objects 507 and procs 511 has to be replaced by the corresponding information from the new Win32 process that was created in the course of execution of the exec function. Second, the handle of each child of the POSIX process corresponding to the Win32 process executing exec (the execing process) must be duplicated into the new Win32 process and the handle of the new Win32 process must be duplicated into the Win32 process corresponding to the parent of the POSIX process corresponding to the execing Win32 process. The details of how this is done will be described later.

A subtlety in the operation of replacing information for the execing Win32 process with information from the new Win32 process is the following: in the preferred embodiment, pid and ppid in 433 of Pproc_t entry 309 function as POSIX process identifiers, but are derived from the process identifiers of the Win32 processes that correspond to the POSIX processes. However, when exec is executed, the POSIX process executing exec ends up corresponding to a different Win32 process. In the preferred embodiment, pid for the POSIX process executing exec and ppid for the children of that POSIX process remain unchanged after an execution of exec. However, Win32 operating systems reuse Win32 process identifiers which have no open handles. In order to prevent such reuse, the handle of the Win32 process corresponding to the POSIX process executing the exec function is saved in ph2 423 for Pproc_t 309 for the new Win32 process created during the execution of exec On subsequent executions of exec by the POSIX process, the contents of ph2 423 are simply copied into the corresponding field in Pproc_t 309 for the new Win32 process created in the subsequent execution of exec and the handle for the Win32 process being replaced by the new Win32 process is simply closed.

Signalling

As pointed out above, in POSIX processes, when a signal occurs, the signal handler is executed in a frame of the POSIX process's user stack 113 which is pushed onto stack 113 as it exists at the time the POSIX process responds to the signal. In Win32 processes, on the other hand, an exception in a thread (n) results in execution of an exception handler which was previously established in the thread's user stack 220(n). Before the exception handler is executed, the user stack 220(n) is "unwound" until the frame is reached where the exception handler was established, and the exception handler is executed on that frame.

What is needed, then, to make a Win32 process behave like a POSIX process is some mechanism which causes the signal handler for the POSIX process to execute on the top of the stack belonging to the primary thread of the Win32 process. In a preferred embodiment, that mechanism has two parts: an exception filter for the primary thread of the Win32 process that responds to invalid addresses and the signal thread. The exeption filter is linked to the Win32 process when the process commences execution. The signal thread is set running when the Win32 process is created and executes a never-ending loop. Each time the thread executes the loop, it first examines the alarmremain field at 441 of Pproc_t entry 309 for the POSIX process corresponding to the Win32 process. That field indicates the time remaining until an alarm event occurs. If the field's value is not 0, the thread reduces its value by the time elapsed since the field was last examined and resets the wait object represented by sigevent handle 427.

Next, the wait object represented by sigevent is set so that the signal thread will wait until the earlier of either the expiration of the time remaining before the alarm event or the occurrence of some other signal. When either event occurs, the signal thread resumes execution. The signal thread first checks alarmremain to see whether the alarm event has occurred; if it has, it sets siggot 405 to indicate that an alarm signal has occurred and resets the wait object represented by sigevent 427. Then, the signal thread examines siginfo 401 to determine whether any signals are pending for the POSIX process. If there are, the signal thread processes the signals. If the signal is a POSIX SIGKILL, SIGCONT, or SIGTERM signal, the signal thread proceeds as follows: in the case of SIGCONT, it merely continues execution of the process; in the case of the other two signals, the signal thread executes handlers for all of the pending signals.

For all other signals, the signal handlers are executed by the principal thread. The principal thread executes them at the top of its user stack 220. To cause the principal thread to do this, the signal thread first suspends the primary thread, then gets the context for the primary thread, saves the primary thread's PC value, and sets the primary thread's PC value to an invalid address. Then, the signal thread resumes the primary thread and resets the event object represented by sigevent handle 427. When the primary thread resumes execution, the invalid address in the PC causes an exception, which in turn results in the execution of the filter, which runs at the top of user stack 220. The filter executes the signal handler wrapper function, which in turn invokes a function called processsig. That function determines which signals are pending and invokes the signal handler specified in sigfunc table 312 for each of the pending signals.

An alternative embodiment does not require the filter. In the alternative environment, the signal thread suspends the primary thread, constructs a frame at the top of the primary thread's user stack, sets the machine registers for the primary thread so that the stack pointer points to the new frame and the program counter points to the signal wrapper function. When the signal thread resumes the primary thread, the primary thread executes the signal wrapper function on the new frame.

Figure 7:
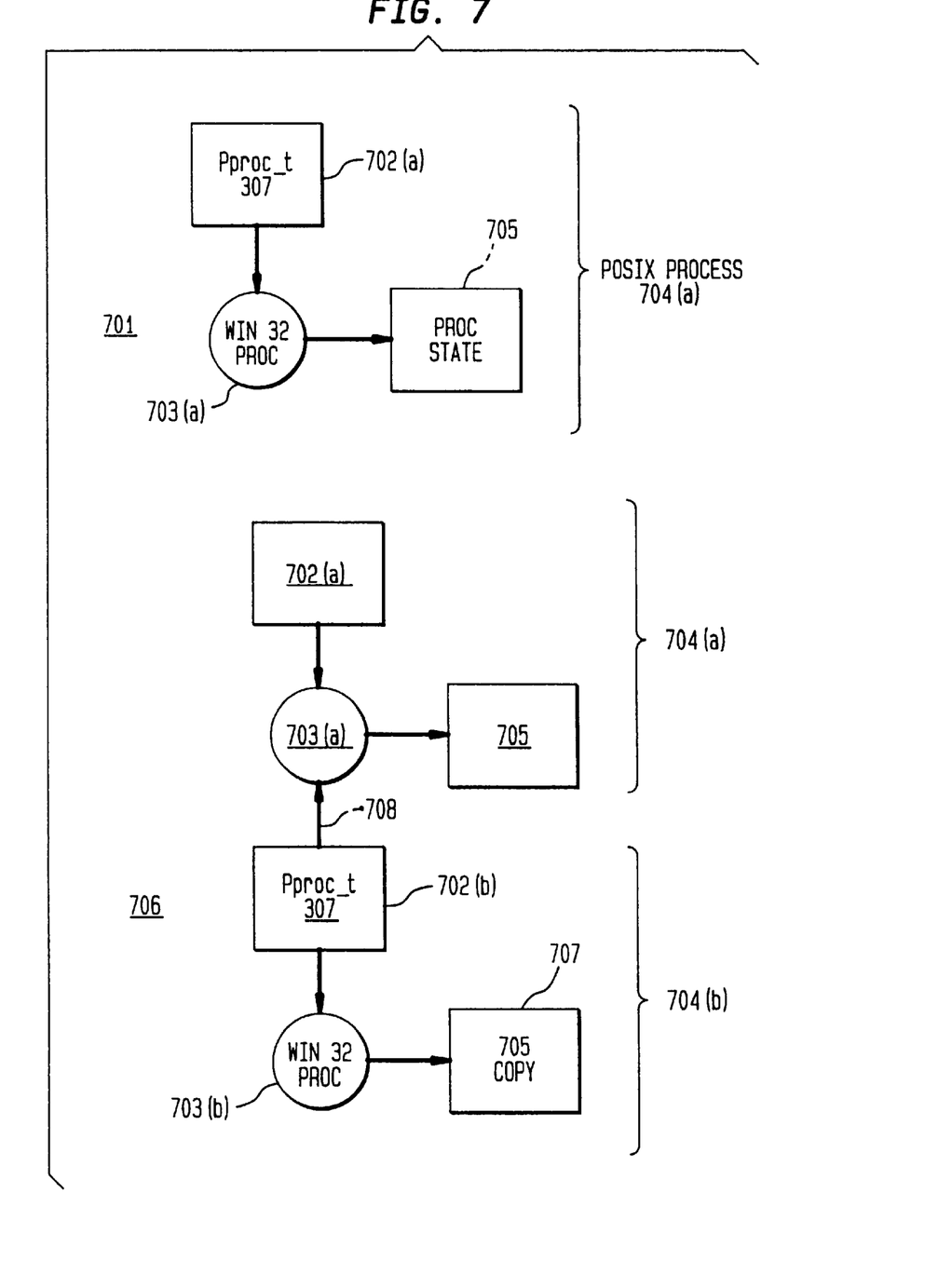
FIG. 7: Overview of the fork operation in a preferred embodiment.

Implementing the POSIX Fork Function: FIG. 7

As described above, when a first POSIX process executes a fork function, the result is a second POSIX process that is a child of the first POSIX process and has a copy of all of the state of its parent. In consequence, at the end of the fork function, both the parent and the child are executing the same code, each, of course, in its own address space. An implementation of fork in a port of the POSIX operating system to the Win32 operating system must solve two problems: establishing the parent-child relationship, which has no equivalent in Win32, and making the copy of the parent's state for the child.

FIG. 7 provides an overview of fork in a preferred embodiment. As shown in FIG. 7, each POSIX process 704 includes a Pproc_t entry 702 for the POSIX process and a Win32 process 703 corresponding to the POSIX process. Win32 process 703 has associated with it process state 705. FIG. 7 shows at 701 a POSIX process 704(*a*) prior to execution of fork. Process 704(*a*) has Pproc_t entry 702(*a*), Win32 process 703(*a*), and process state 705. At 706, FIG. 7 shows the result of an execution of fork by POSIX process 704(*a*). POSIX process 704(*a*) now has a child POSIX process 704(*b*). POSIX process 704(*b*) has its own Pproc_t entry 702(*b*), its own Win32 process 703(*b*), and a copy 707 of state 705 belonging to Win32 process 703(*a*). The parent-child relationship between POSIX process 704(*a*) and POSIX process 704(*b*) is of course indicated by the field ppid 433 in Pproc_t entry 702(*a*), and is represented in FIG. 7 by arrow 708.

In the following discussion, the POSIX process which invokes fork will be called the parent and the POSIX process which results from the execution of fork will be called the child. In the preferred embodiment, fork is implemented as follows: When the parent POSIX process invokes fork, the primary thread of the corresponding Win32 process (the parent Win32 process) executes a setjmp function which establishes an environment that a longjmp function executed by the primary thread of the Win32 process corresponding to the child POSIX process (the child Win32 process) can return to. Of course, what the child Win32 process returns to is the copy of the environment in the state of the child POSIX process.

Next, the parent Win32 process sets up a pipe which will be later used to communicate with the child Win32 process. Thereupon, it invokes a start_proc function which makes a Pproc_t entry 309 for the child POSIX process, sets up the entry 309 as required for the child POSIX process, creates the child Win32 process, and sets its wait and primary threads going. Continuing in more detail with start_proc, when the function makes Pproc_t entry 309 for the child process, it copies the parent's pid into ppid 443 and copies the corresponding fields of the parent's Pproc_t entry 309 into fields pgid, sid, fdtab 435, and siginfo 401. Then the function obtains the address of the top of the user stack of the parent Win32 process's main thread and stores it in *forksp 443 in the child POSIX process's Pproc_t entry 309. Next, it gets the command line of the Win32 process corresponding to the parent POSIX process and makes a copy of the handles belonging to the Win32 process corresponding to the parent POSIX process. Included in these handles are the handles to the pipe that the parent created earlier. Next, inuse field 431 of the child POSIX process's Pproc_t entry 309 is incremented using a Win32 InterlockedIncrement function, and thereupon, the Win32 process corresponding to the child POSIX process is created using the Win32 CreateProcess function. When created, the Win32 process is suspended. The ntpid field 419, the pgid field, and the pid field 443 of the child POSIX process's Pproc_t entry 309 are set from the process identifier value for the newly-created Win32 process.

Next, waitevent field 429 in the parent POSIX process's Pproc_t entry 309 is checked to determine whether it has a value. If it does not, the parent has no children and no wait thread. It is thus necessary to create and start the wait thread in the parent, using the Win32 CreateThread function. If the wait thread is present (either because it was created earlier or has just been created), the wait object that the wai.tevent handle 429 in the parent waits on is set, which in turn causes the wait thread to resume execution and proceed as described above. This done, the primary thread of the new Win32 process is set going and the thread handle is duplicated and placed in ph field 421 of the Pproc_t entry 309 for the child POSIX process.

When the primary thread of the new Win32 process begins executing, the code which it executes first causes the primary thread to dynamically link DLL 305 containing the Win32 implementations of the POSIX functions to the new Win32 process, thereby enabling the new Win32 process to execute code written for a POSIX operating system. Then the code creates a wait object and assigns the handle for the wait object to the field sigevent 427 in the child POSIX process's Pproc_t entry 309. Next, the code creates and starts the signal thread for the new Win32 process, which of course is controlled by the wait object for which sigevent is the handle. Next, the code tests the field *forksp 443, which is set only if the Win32 process corresponding to the child POSIX process was created by the fork function. If the field is set, the code invokes a function called child_fork which finishes execution of the fork function in the Win32 process corresponding to the child POSIX process. The function is invoked with the pid of child's parent POSIX process and forksp 443.

Continuing with the code in child_fork, the new Win32 process grows the space it needs for its copy of the user stack for the primary thread of the Win32 process which corresponds to the parent POSIX process by recursively invoking child_fork until the top of the user stack produced by the recursions is at the position in the new Win32 process's address space specified by forksp 443. forksp 443 was, however, set from the value of the stack pointer for the primary thread of the Win32 process corresponding to the parent POSIX process while that thread was executing the start_proc function invoked from the fork function. In consequence, the user stack for the primary thread of the Win 32 process corresponding to the child POSIX process will be larger than that required for the Win32 process corresponding to the POSIX child process to make a copy of the primary thread user stack of the Win32 process corresponding to the POSIX parent process. The next step is to copy the read-write regions from the Win32 process corresponding to the parent POSIX process into the new Win32 process's address space. Next, duplicates are made for the new Win 32 process of those handles of the Win32 process corresponding to the POSIX parent process which were marked "close on exec". Finally, the primary thread user stack of the Win32 process corresponding to the parent is copied to the primary thread user stack of the new Win 32 process.

After the new Win 32 process has thus received a copy of the state of the Win32 process corresponding to the parent POSIX process, the new Win32 process does a longjmp, which takes it to the location specified when setjmp was executed in the Win32 process corresponding to the parent POSIX process. However, the state saved by setjmp was part of the state copied to the new Win32 process, and consequently, the location is in the address space of the new Win32 process. The code executed by the new Win 32 process writes a message to the pipe set up by the Win32 process corresponding to the parent POSIX process and returns from the fork function. As required by the POSIX specification, the returned value is 0. While all of this has been going on in the new Win32 process, the Win32 process corresponding to the parent POSIX process has been waiting to receive a message from the child via the pipe. The message contains the pid of the Win32 process corresponding to the child POSIX process, and when the Win32 process corresponding to the parent receives the message, it returns from fork, returning the child's pid as it does so, again as required by the POSIX specification. Thus, at the end of fork, the Win32 process corresponding to the child POSIX process has exactly the same state as the Win32 process corresponding to the parent POSIX process and both are executing the same POSIX code.

Figure 8:
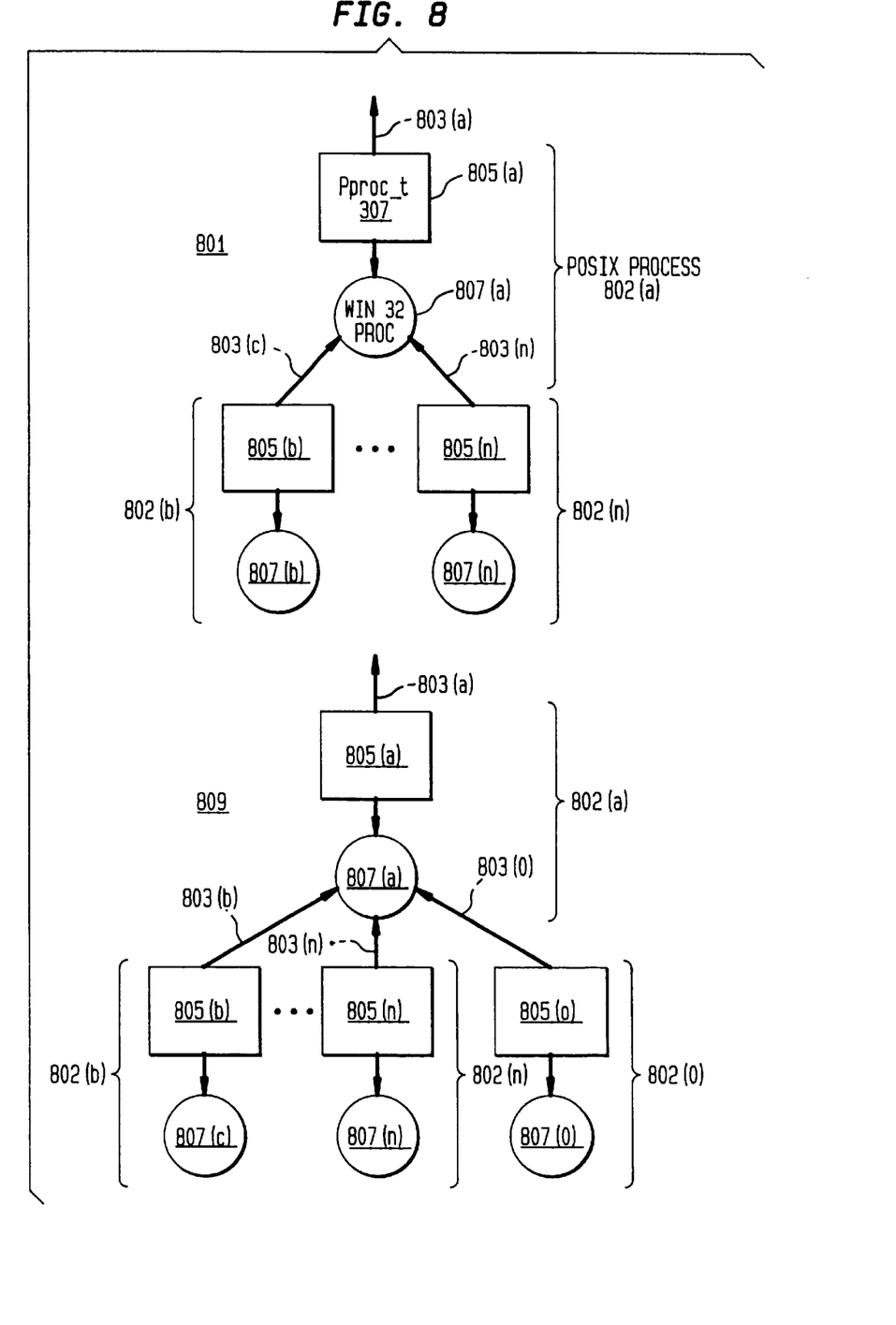
FIG. 8: Overview of a first part of the exec operation in the preferred embodiment.
Figure 9:
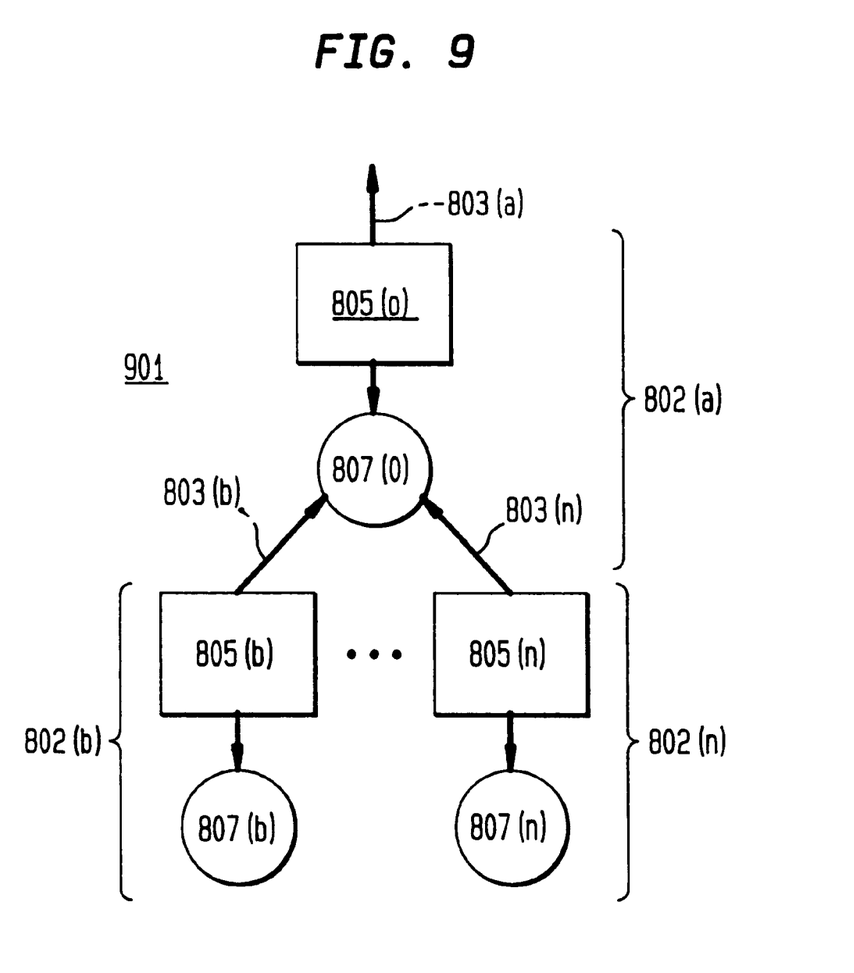
FIG. 9: Overview of the conclusion of the exec operation in the preferred embodiment.

Implementing the POSIX Exec Functions: FIGS. 8 and 9

The POSIX standard specifies a family of six exec functions. Arguments for the function specify at least a file containing executable code. Each of the functions has the same effect: when a POSIX process executes one of the exec functions, the POSIX process replaces the executable code for the program that contains the invocation of the exec function with the executable code specified in the arguments for the function and begins executing that code. The replacement of the executable code does not affect the parent-child relationships of the process. Further, since the executable code for the program containing the exec function has been replaced, there is no return from a successful exec function to that program. The members of the family of exec functions differ in the ways in which they specify the arguments for the executable code and the environment within which the executable code is executed.

In Win32 operating systems, the threads of a Win32 process can only execute the code specified when the Win32 process was created. Thus, the only way to execute code not already specified for a process is to create a new Win32 process for the execution. Clearly, this does not correspond to the semantics of POSIX exec, which does not create a new process, but simply causes an existing process to execute new code.

The main issue in implementing exec in a Win32 operating system is integrating the new Win32 process that must be created to execute the executable code specified in the exec invocation into the system of parent-child relationships to which the corresponding POSIX process belongs. A prior-art approach to solving this problem is simply to maintain the Win32 process corresponding to the POSIX process executing exec after a new Win32 process has been created to execute the program. The original Win32 process continues to exist only to keep its POSIX parent from receiving a SIGCHLD signal indicating that the POSIX process corresponding to the original Win32 process has exited. The problem with this approach is that there is a finite number of Win32 processes available to a Win32 operating system, and a POSIX process which executed a program that repeatedly performed an exec operation could end up using all of the available Win32 processes. To eliminate this problem, the preferred embodiment replaces the Win32 process corresponding to the POSIX process that executes exec with the new Win32 process required to execute the program specified in exec. In the preferred embodiment, therefore, a POSIX process has only one Win32 process corresponding to it except when it is executing exec, and in that situation, it has only two Win32 processes corresponding to it.

FIGS. 8 and 9 provide an overview of what happens in the preferred embodiment when a POSIX process executes an exec function. In FIG. 8, the POSIX process executing exec is POSIX process 802(*a*), which has a Pproc_t entry 805(*a*) and a Win32 process 807(*a*). 801 shows the condition of POSIX process 802(*a*) prior to executing exec. POSIX process 802(*a*) has a number of child POSIX processes, indicated by 802(*b* . . . *n*) and is itself a child of another POSIX process, as indicated by arrow 803(*a*). Of course all of the Win32 processes 807 also have process state, but that is not relevant to exec and is consequently not shown.

809 in FIG. 8 shows the condition of POSIX process 802(*a*) midway through the execution of exec. POSIX process 802(*a*) has acquired a new child, POSIX process 802(*o*), which will execute the program specified in the invocation of exec. However, in POSIX operating systems, exec does not involve the creation of a new POSIX process; consequently, Win32 process 807(*o*) and Pproc_t entry 805(*o*) must replace Win32 process 807(*a*) and Pproc_t entry 805(*a*) in POSIX process 802(*a*). The result of doing this is shown at 901 in FIG. 9. As is apparent from that Figure, when Win32 process 807(*o*) replaces Win32 process 807(*a*), the parent and child relationships of POSIX process 802(*a*) must be restored. These relationships express themselves in two ways: in the fields of Pproc_t entry 805(*o*) for Win32 process 807(*o*) and in the handles available to Win32 process 807(*o*) and to the Win32 process corresponding to the parent of POSIX process 802(*a*). With regard to the fields of Pproc_t entry 805(*o*), ppid in Pproc_t entry 805(*o*) for Win32 process 805(*o*) must specify pid in the Pproc_t entry for Win32 process 807 belonging to POSIX process 802(*a*)'s parent, as indicated by arrow 803(*a*). Further, ppid in the Pproc_t entry for each each of POSIX process 802(*a*)'s children 802(*b* . . . *n*) must specify pid in Pproc_t entry 805(*o*). With regard to the handles, at the beginning of exec, the Win32 process corresponding to the parent POSIX process of POSIX process 802(*a*) has a handle for Win32 process 807(*a*) corresponding to POSIX process 802(*a*) and Win32 process 807(*a*) has a handle for each of the Win32 processes 807(*b* . . . *n*) corresponding to child POSIX processes 802(*b* . . . *n*). At the end of exec, the Win32 process corresponding to the parent POSIX process of POSIX process 802(*a*) has a handle for Win32 process 807(*o*) and POSIX process 807(*o*) has a handle for each of the Win32 processes 807(*b* . . . *n*). Once the parent-child relationship has been restored, Win32 process 807(*a*) may terminate itself, reaching the result shown in FIG. 9.

Continuing in more detail, in the preferred embodiment, all of the varieties of the POSIX exec function invoke a function in DLL 305 called execve, which takes as arguments the pathname for the program to be executed, an array of the program's arguments, and an array of environmental values. execve begins by setting inexec 437 in Pproc_t entry 309 for the POSIX process executing the exec function to indicate that that POSIX process is in the process of executing the exec function.

Then execve invokes a function called launch, which interprets the pathname, the program's arguments, and the environmental values and invokes start_proc to create the new Win32 process and get it started. start_proc can determine from inexec that an execution of execve is creating and starting the new Win32 process. In that case, start_proc proceeds as follows: first it initializes a Pproc_t entry 309 for the new Win32 process from the Pproc_t entry 309 for the POSIX process executing the POSIX exec function. Then it copies the POSIX process's handles except for where they have the POSIX "close on exec" attribute into fdtab 435 for the new Win 32 process, copies the value of pid field 433 in the Pproc_t entry 309 for the new Win32 process from the same field in the entry 309 for the POSIX process executing exec, and increments inuse field 431 for the new Win32 process. Then it creates the new Win32 process. Once that is done, it sets fields in Pproc_t entry 309 for the new Win32 process: ph field 421 is set to the handle for the new Win32 process and ntpid field 419 is set to the Win32 pid for the new Win32 process.

Then, as described above with regard to fork, start proc checks waitevent field 427 to find out whether there is a wait event object in the Win32 process corresponding to the POSIX process executing exec; if there is not, it is created and its handle assigned to waitevent 427. If the wait event object was created, the the wait thread is created in the Win32 process corresponding to the POSIX process executing exec and the event object for the thread is set, causing the wait thread to begin execution.

As previously described, on execution, the wait thread makes a wait object for the new Win32 process. It also processes the list of wait objects. Each wait object points to Pproc_t 309 for the Win32 process represented by the wait object. When the Win32 process represented by a wait object corresponds to a POSIX process that is executing exec, Pproc_t for that Win32 process will have the value 0 in sid in 433 of its Pproc_t 309. When the wait thread encounters such a Win32 process, it replaces the pointer to Pproc_t 309 for that Win32 process with a pointer to Pproc_t 309 for the new Win32 process created in the course of execution of exec. Then the wait thread examines ph2 field 423 of Pproc_t 309 for the new Win32 process to determine whether it has been set. If not, the POSIX process corresponding to the new Win32 process is doing its first exec, and it is necessary to save the handle of the old Win32 process for the POSIX process in ph2 field 423 to prevent pid 433 from becoming invalid. Otherwise, ph2 423 is simply copied over and the handle of the old Win32 process is closed.

Continuing with start_proc, that function next starts the primary thread of the new Win32 process and sets thread field 425 in Pproc_t entry 307 for the new Win32 process to a duplicate of the handle for the primary thread. After start_proc returns to launch, launch executes a wait of 400 milliseconds on the new Win32 process in order to permit the primary thread to perform the initializations required for the new Win32 process and then returns the Pproc_t entry 307 for the new Win32 process to execve.

In execve, execution proceeds with the freeing of the Pproc_t entry 307 for the new Win32 process. In the preferred embodiment, freeing affects only the values of the fields pid, ppid, pgid, ntpid, and inuse of entry 307. If there is a wait thread in the Win32 process corresponding to the POSIX process executing exec, the thread is suspended. If the new Win32 process has already exited, the handles ph 421 and ph2 423 are closed and the new Win32 process is terminated. Otherwise, execve works through Proctab 307 looking for Pproc_t entries 309 for the parent of the POSIX process executing exec and the children of that POSIX process. Whenever an entry 309 is found for a Win32 process corresponding to a POSIX process which is a child of the POSIX process corresponding to the execing Win32 process, the primary thread uses the Win32 DuplicateHandle function to duplicate the handle in ph 421 for the entry from the execing Win32 process to the new Win32 process; when the entry 309 for the new Win32 process itself is found, the primary thread duplicates the handle for the new Win32 process from the new Win32 process to the parent of the execing process.

Once the reparenting is finished, the pid of the POSIX process executing exec is assigned to pid field 433 in Pproc_t entry 307 for the Win32 process executing the new program, sid 433 is set as described above i to 0 to indicate to the wait thread that the Win32 process is the old Win 32 process corresponding to a POSIX process that is executing exec, and alarm and alarmremain are copied from the Pproc_t entry for the Win32 process executing exec to the Pproc_t entry 307 for the Win32 process executing the new program. Thereupon, the Win32 process executing exec terminates itself.

1 Conclusion

The foregoing Detailed Description had disclosed to those skilled in the arts to which the invention pertains the best mode presently known to the inventor of implementing his invention. However, as is well-known to those skilled in the programming arts, the principles of the invention can be implemented using specific data structures and algorithms different from those disclosed herein. Further, while the Detailed Description sets forth how the principles of the invention may be used to port a POSIX operating system to a Win32 operating system, they apply equally in any situation in which a single-threaded process having signalling semantics or parent-child semantics similar to those of POSIX processes is ported to an operating system which employs multi-threaded processes.

All of the above being the case, the foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the law.

What is claimed is:

1. A method of implementing a first process creation operation defined in a first operating system, wherein a created process receives a copy of a state of a creating process, in a second operating system having a second process creation operation, wherein the created process does not receive the copy of the state of the creating process, the method comprising the steps of:

in the creating process, performing an operation which saves jump state for a later transfer of control; and         using the second process creation operation to create the created process; and     in the created process,         making a copy of the creating process's state, including the jump state; and         performing an operation which transfers control as specified in the jump state.

2. The method set forth in claim 1 further comprising the steps of:

in the creating process, saving a current user stack pointer for the creating process in a location accessible to the created process; and     in the created process,         using the saved current user stack pointer to make the copy of the creating process's state that:

the data storage device stores code which, when executed, implements the apparatus of any of claims 1, 2, 3, 4, or 5.

3. A method of implementing an operation, defined in a first operating system, for commencing execution of a new program by a first process, the first process being one of a plurality of first processes, while maintaining a plurality of parent-child relationships between the first process and the plurality of first processes, in a second operating system which has a plurality of second processes but does not have the operation, the operation being executed by a second process, the second process being one of a plurality of second processes, which is associated with the first process, the method comprising the steps of:

creating a third process from the plurality of second processes to execute the new program;

replacing the second process with the third process while maintaining the plurality of parent-child relationships of the first process; and     terminating the second process.

4. The method set forth in claim 3 wherein:

each one of the plurality of second processes has a process identifier which does not change as long as a handle for the second process remains open; and     the handle for the second process is saved, whereby the process identifier for the second process may be used as a process identifier for the first process.

5. The method set forth in claim 3 wherein:

maintaining the plurality of parent-child relationships of the first process includes replacing a data structure representing the second process with a data structure representing the third process.

6. The method set forth in claim 3 wherein:

maintaining the plurality of parent-child relationships of the first process includes making a handle of the third process available to a fourth process of the second processes which corresponds to a parent first process of the first process and a handle of a fifth process of the second processes which corresponds to a child process of the first process available to the third process.

7. A data storage device, the data storage device being characterized in that:

the data storage device stores code which, when executed, performs the method steps of any of claims 1, 2, 3, 4, 5, or 6.

\* \* \* \* \*